E. L. SCHMITZ.
PENCIL.
APPLICATION FILED DEC. 21, 1909.
960,588.
Patented June 7, 1910.
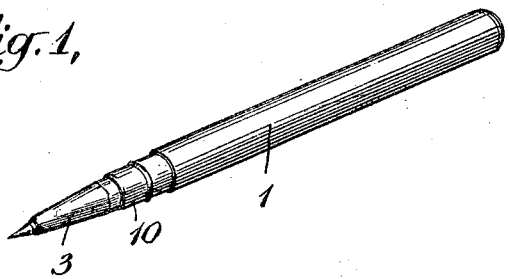
Fig. 1,
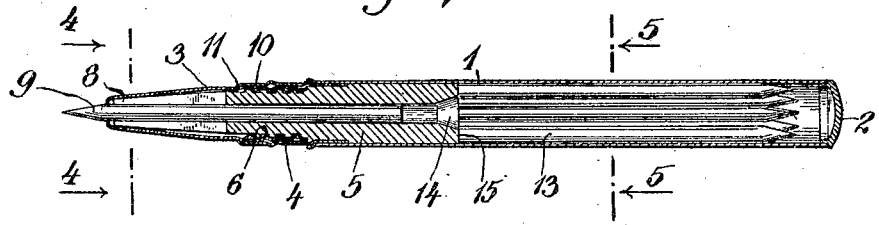
Fig. 2,
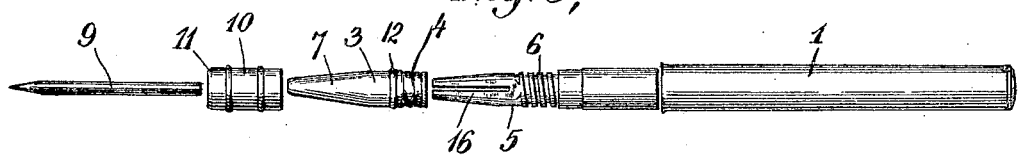
Fig. 3,
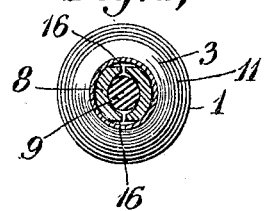
Fig. 4,
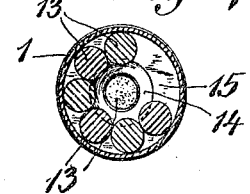
Fig. 5,
WITNESSES:
INVENTOR
BY
ATTORNEY

UNITED STATES PATENT OFFICE.

EGON L. SCHMITZ, OF NEW YORK, N. Y., ASSIGNOR TO EBERHARD FABER PENCIL COMPANY, OF BROOKLYN, NEW YORK, A CORPORATION OF NEW YORK.

PENCIL.

960,588.  Specification of Letters Patent.  Patented June 7, 1910.

Application filed December 21, 1909. Serial No. 534,283.

*To all whom it may concern:*

Be it known that I, EGON L. SCHMITZ, a citizen of the United States, residing in the city, county, and State of New York, have invented certain new and useful Improvements in Pencils, of which the following is a specification.

This invention relates to pencils of the type having a stick of lead which is movable to inoperative position within the casing of the pencil or to operative position with its end projecting from the end of the casing, and particularly to pencils of this character known as "magazine pencils," adapted to carry a plurality of sticks of lead which may be brought into operative position one after another.

The invention is directed to the provision of a pencil of this type which may be manufactured at very low cost, with which the danger of breakage of the lead-sticks is reduced to a minimum, which is convenient to use in that the casing thereof may have a smooth exterior, and which is so formed that the parts thereof cannot be disassembled.

The preferred embodiment of the invention is illustrated in the accompanying drawings, in which—

Figure 1 is a perspective view of the completed pencil; Fig. 2 is a longitudinal section thereof; Fig. 3 is an elevation of the several parts of the pencil before being assembled; Fig. 4 is a section on line 4—4 of Fig. 2; and Fig. 5 is a section on line 5—5 of Fig. 2.

Referring to these drawings, the pencil consists of a tubular casing 1, preferably formed of metal and having one end thereof closed, as at 2, either by an integral portion of the casing 1 or a cap secured to the end of the casing 1, this cap being, if desired, arranged to hold an eraser. At the end of the casing opposite this closed end, is an end-piece 3, which is tapered as shown and which is movable relatively to the casing 1. On the end of the end-piece 3 opposite that which is tapered, is a screw-thread 4 lying within the tubular casing of the pencil. Within the casing is a lead-holder 5, provided with a thread 6 adapted to coact with the thread 4 on the end-piece 3. The end of the lead-holder 5 lying within the end-piece 3 is tapered as shown at 7, and is slotted lengthwise to provide clamp-jaws 8 adapted to be forced into engagement with the interior wall of the tapered end-piece 3, so as to cause the clamp-jaws to grip a stick of lead 9 extending between them. The lead-holder 5 is fixed relatively to the casing of the pencil. For this purpose, I employ a tubular metallic piece 10, which is secured to the lead-holder 5 and to the tubular casing 1, and which forms an extension of the casing 1. This piece 10 may be secured to the holder 5 in any suitable manner, as by punching it at suitable points to force projections into the wood of the holder 5. The outer end of the piece 10 is curled inwardly slightly, as shown at 11, and this inwardly turned flange coacts with a bead 12 formed in the end-piece 3, so as to preclude the withdrawal of the movable end-piece 3 from the casing of the pencil. The end of the tubular casing 1 is secured to the tubular piece 10 in any suitable manner, as by crimping the end thereof upon a bead formed in the piece 10.

The lead-holder 5 is of such length that considerable space is provided between the closed end 2 of the casing of the pencil and the adjacent end of the holder 5, and this space is adapted to receive a plurality of sticks of lead, as shown at 13. The axial bore extending through the holder 5 is enlarged at the inner end of the holder, as shown at 14, this enlargement being preferably of conical form. The enlargement of this axial bore, however, does not extend out to the cylindrical surface of the holder 5, but is of such size as to provide a shoulder upon the inner end of the holder 5, as shown at 15.

At the tapered end of the holder 5, the latter is cut away on opposite sides thereof, at the side edges of the slot which is cut in the holder to form the clamp-jaws 8. These flattened sides of the holder 5 are shown at 16 in Figs. 3 and 4. The flattening of the sides of the clamp-jaws 8 in this manner aids materially in insuring a proper gripping of the lead-stick by the clamp-jaws 8, for when the clamp-jaws are forced together there is a tendency to flatten them somewhat, and if the sides of the clamp-jaws were not so cut away, these sides would come into engagement with the adjacent wall of the end-piece 3 and limit the movement of the clamp-jaws toward each other, this limitation of the movement of the clamp-jaws being such in some cases as would prevent the jaws from gripping the lead tightly.

After the parts of the pencil have been assembled in the manner above described, the sticks of lead 13 are inserted in the bore in the holder 5 and moved back into the magazine between the holder and the closed end of the casing 1. If these sticks of lead 13 are sharpened at one end, they are inserted with their pointed ends away from the tapered end of the pencil, so that the squared ends of the lead-sticks 13 will abut against the shoulder 15. If the sharpened ends of the lead-sticks 13 were adjacent to the end of the holder 5, they might move into the enlargement 14 of the bore in the holder 5 and either cause breakage of the lead or a wedging action which would prevent one of the lead-sticks from moving freely into the bore in the holder 5.

It will be noted that the parts 1, 10 and 5 are rigidly connected, and that the part 3 is movable relatively to these parts. In order to use the pencil, it is only necessary to bring a stick of lead into the position shown in Fig. 2, and then turn the tapered end-piece 3 relatively to the casing 1. This will cause engagement of the clamp-jaws 8 with the interior wall of the tapered end-piece 3, and the clamp-jaws will be forced together, so that they will grip the lead-stick 9. The lead-stick is gripped over an extended area, because of the shape of the clamp-jaws 8, and therefore the danger of breakage of the lead-stick is very much less than is the case when metallic clamp-jaws are employed which grip the lead-stick on a line extending around the holder. The casing of the pencil presents a smooth exterior, so that the pencil may be used for an extended period without tiring the hand of the user. Furthermore, the parts of the pencil cannot be disassembled, so that the danger of breakage or loss of the parts is avoided.

Having now described my invention, what I claim as new therein and desire to secure by Letters Patent is as follows:—

1. A pencil comprising a tubular casing having an inwardly turned flange at one end, an end-piece for the casing tapered at one end, having a thread formed therein at the opposite end and provided with a bead between said taper and thread, said threaded end of the end-piece extending within the casing and said bead and flange coacting to preclude withdrawal of the end-piece, a lead-holder within the casing and secured thereto having a thread coacting with said thread and slotted at one end to provide clamp-jaws engaging the interior walls of the tapered portion of the end-piece, and a stick of lead in a bore in said lead-holder, substantially as set forth.

2. A pencil comprising a tubular casing, a wooden lead-holder extending within the same, a tubular piece secured to the casing and lead-holder and having an inwardly-turned flange at its end, an end-piece tapered at one end, threaded at the other end and having a bead intermediate the taper and thread, said threaded end of the end-piece and said bead extending within said tubular piece and the flange and bead coacting to preclude withdrawal of the end-piece, said lead-holder having a thread formed thereon coacting with said thread on the end-piece and being slotted at one end to provide clamp-jaws engaging the interior walls of the tapered portion of the end-piece, and a stick of lead in a bore in said lead-holder, substantially as set forth.

This specification signed and witnessed this 17th day of December, 1909.

EGON L. SCHMITZ.

Witnesses:
ELMER H. OLMSTEAD,
CHARLES SHEA.